United States Patent [19]
Hess et al.

[11] Patent Number: 5,085,043
[45] Date of Patent: Feb. 4, 1992

[54] ELECTRO-MECHANICAL INTERLOCK AND MODULE SYSTEM FOR LAWN MOWER OR OTHER ELECTRICAL DEVICE

[75] Inventors: Kristoffer A. Hess, Brockville; Colin Dyke, North Agusta; David M. Shaver, Brockville, all of Canada

[73] Assignee: Black & Decker Inc., Newark, Del.

[21] Appl. No.: 532,038

[22] Filed: Jun. 1, 1990

[51] Int. Cl.$^5$ .................. A01D 34/82; A01D 75/18
[52] U.S. Cl. ........................ 56/10.5; 56/10.8; 320/2
[58] Field of Search ............ 56/10.5, 10.8, 16.7, 56/17.5, 320.1, DIG. 24

[56] References Cited

U.S. PATENT DOCUMENTS

| | | | |
|---|---|---|---|
| 2,597,735 | 5/1952 | Jepson | 320/2 |
| 2,735,908 | 2/1956 | Peretti et al. | |
| 3,212,938 | 10/1965 | Neuhardt et al. | |
| 3,581,480 | 6/1971 | O'Conner, III et al. | 320/2 |
| 3,598,162 | 8/1971 | Rosenthal, Jr. | 200/44 |
| 3,676,989 | 7/1972 | Slayton | 56/10.5 |
| 3,696,593 | 10/1972 | Thorud et al. | 56/17.5 |
| 3,769,473 | 10/1973 | Lay | 200/44 |
| 3,849,612 | 11/1974 | Cobb et al. | 200/11 J |
| 3,950,625 | 4/1976 | Klebe, Jr. et al. | 200/42 R |
| 4,044,532 | 8/1977 | Lessig, III | 56/10.5 |
| 4,104,490 | 8/1978 | Lundstrom et al. | 200/44 |
| 4,146,825 | 3/1979 | Harhay | 320/29 |
| 4,359,615 | 11/1982 | Meyerhoefer et al. | 200/42 R |
| 4,430,604 | 2/1984 | Loganbill et al. | 56/10.5 |
| 4,433,530 | 2/1984 | Schaefer | 56/10.5 |
| 4,454,392 | 6/1984 | Rapp et al. | 200/44 |
| 4,636,603 | 1/1987 | Pliml | 200/296 |
| 4,882,896 | 11/1989 | Wilcox | 56/10.5 |

FOREIGN PATENT DOCUMENTS

| | | |
|---|---|---|
| 924789 | 4/1973 | Canada . |
| 1228743 | 11/1987 | Canada . |
| 1258382 | 8/1989 | Canada . |
| 1263035 | 11/1989 | Canada . |

*Primary Examiner*—Ramon S. Britts
*Assistant Examiner*—Terry Lee Melius
*Attorney, Agent, or Firm*—Charles E. Yocum; Dennis A. Dearing; John D. Del Ponti

[57] ABSTRACT

An electro-mechanical interlock and module system for an electrically powered device such as a cordless, electric lawn mower that includes a normally open interlock switch for controlling the enabling of the power circuit for the lawn mower. A key member is adapted for insertion into a specially configured opening in the mower housing to actuate and close the interlock switch. With the interlock switch closed, energization of the motor is controlled by a separate handle-mounted ON/OFF switch in a conventional manner. In addition, a modular assembly technique is disclosed which facilitates ease of manufacturing while assuring proper alignment between the various components of the interlock system.

26 Claims, 6 Drawing Sheets

ELECTRO-MECHANICAL INTERLOCK AND MODULE SYSTEM FOR LAWN MOWER OR OTHER ELECTRICAL DEVICE

BACKGROUND AND SUMMARY OF THE INVENTION

The present invention relates to an electro-mechanical interlock and module system for an electrical device, such as an electric lawn mower, that controls the operative state of the device.

In various types of power equipment, such as an electric lawn mower, it is desirable to preclude inadvertent or unauthorized operation of the power switch and hence of the equipment controlled thereby. The prior art has proposed various means for accomplishing this function, which typically comprise mechanisms that selectively present a mechanical interference to the operation of the power switch. However, the primary disadvantage of these interlock mechanisms is that they are not "user friendly". In other words, the inconvenience caused by such mechanisms is frequently a source of user complaint and can even lead to users devising ways of defeating the interlock feature altogether, thereby eliminating the safety benefits of the mechanism.

Accordingly, it is the primary object of the present invention to provide an interlock system for an electrically powered device, such as an electric lawn mower, that is "user friendly", and yet is effective to completely disable the device.

In addition, it is an object of the present invention to provide an interlock system that is particularly adapted for use with a cordless, rechargeable, electrically powered device, such that when the interlock system is in a first position the device is disabled and the charging system is operable, and in a second position the device is enabled and the charging system is inoperable.

Furthermore, it is an object of the present invention to provide an improved interlock and module system that is configured to provide ease of assembly and ensure proper alignment between interactive components of the system.

In general, the present invention, which in the preferred embodiment is incorporated into a cordless, rechargeable lawn mower, employs a mechanical "key" member that is adapted for insertion into a specially configured opening in the top of the motor shroud. The key member includes a cam surface that engages and actuates the plunger of a normally open interlock switch when the key member is fully inserted into the opening, thereby closing the switch and enabling the lawn mower power circuit. Simultaneously, an integral tab portion on the key member blocks the charging port so that the operator cannot connect the male plug from an outlet mounted charging transformer to the charger circuit when the power circuit is enabled. Conversely, when the key member is removed from the shroud, the normally open interlock switch returns to its OFF position and the power circuit of the lawn mower is disabled. In addition, with the key member removed, the charging port is exposed, thereby permitting connection of the charger circuit to a charging transformer.

Significantly, the power circuit of the lawn mower also includes a conventional handle-mounted ON/OFF switch that controls the application of power to the motor when the power circuit in enabled. However, when the power circuit is disabled by the interlock switch, power cannot be applied to the motor, regardless of the position of the handle-mounted ON/OFF switch. Thus, unauthorized operation of the lawn mower, by children for example, is prevented.

The preferred embodiment of the present invention also incorporates unique means for enhancing ease of assembly while at the same time ensuring proper alignment between the various interactive components of the interlock system. The configuration of the key member and the corresponding opening in the shroud are also designed to discourage the intentional insertion of foreign objects into the opening to defeat the purpose of the interlock system.

Additional objects and advantages of the present invention will become apparent from the following detailed description of the preferred embodiment which makes reference to the drawings of which:

DETAILED DESCRIPTION OF THE PREFERRED EMBODIMENT

Figure 1:
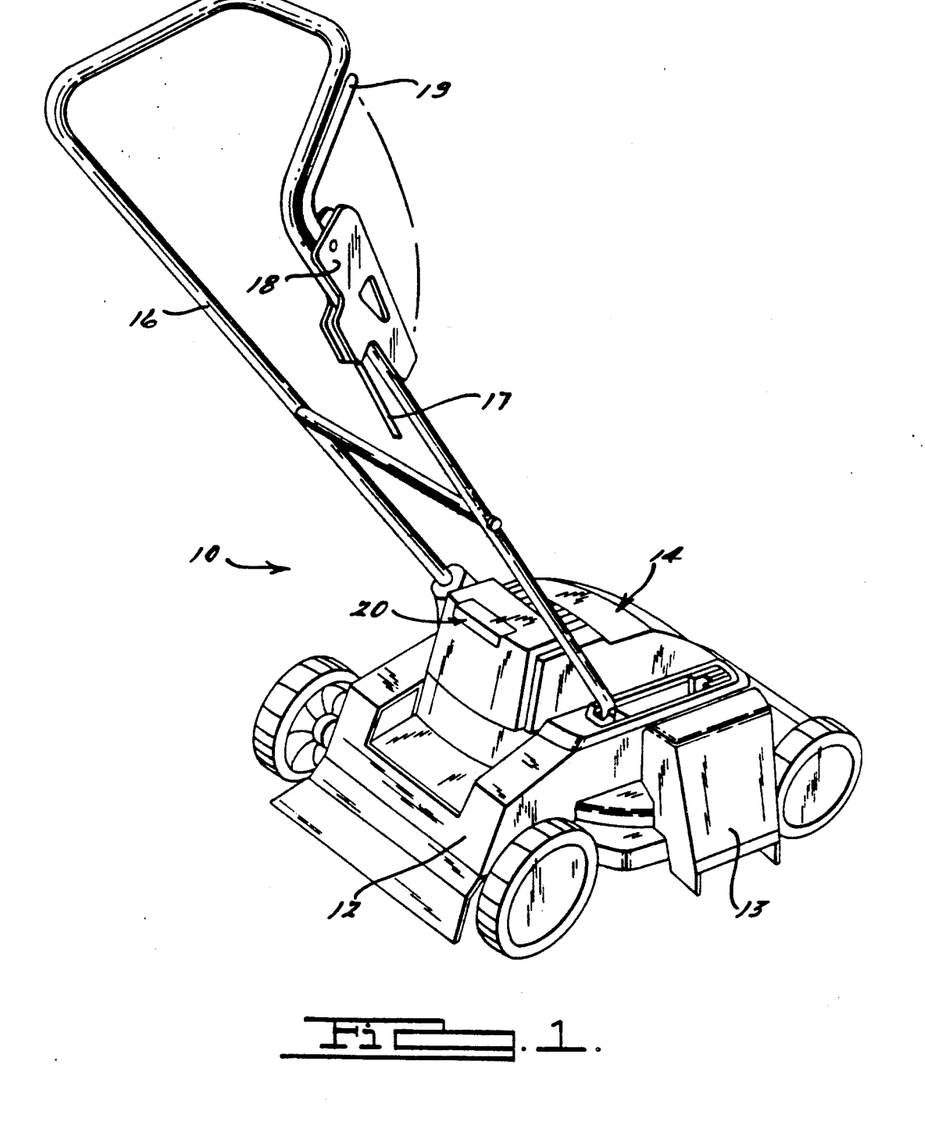
FIG. 1 is a perspective view of a cordless electric lawn mower incorporating the interlock system of the present invention.

Referring to FIG. 1 a pictorial view of an electric lawn mower incorporating the electro-mechanical interlock system of the present invention is shown. While the present invention is described herein in combination with an electric lawn mower, it will be appreciated that it is equally applicable to other electrically powered devices such as other gardening tools or power tools such as a table saw or drill press. The cordless electric lawn mower 10 illustrated in FIG. 1 comprises a mower deck 12 having mounted thereon under shroud 14 a battery that is adapted to power an electric motor for driving a cutting blade located beneath the mower deck 12. Grass clippings are blown out through the discharge chute 13 on the side of the mower deck 12. A handle 16 that is removably attached to the mower deck 12 has mounted thereon a switch mechanism 18 for controlling the application of power from the battery to the motor via a cable 17. Preferably, the switch mechanism 18 includes an actuating lever 19 that requires two physically distinct movements to actuate the switch between the OFF and ON positions. A switch of this type is described in U.S. Pat. No. 4,044,532, assigned to the assignee of the present application. In addition, the switching lever 19 is normally biased into the OFF position so that when the operator releases the handle, power to the motor is automatically interrupted.

Also illustrated in FIG. 1 in its installed or "RUN" position is a mechanical "key" member 20 that is adapted to be inserted into a specially configured opening in the shroud 14. As will subsequently be explained in greater detail, when the key member 20 is installed as shown, an interlock switch located inside the shroud 14 is actuated, thereby enabling the power circuit so that energization of the motor is controlled by the handle switch 18.

Figure 10:
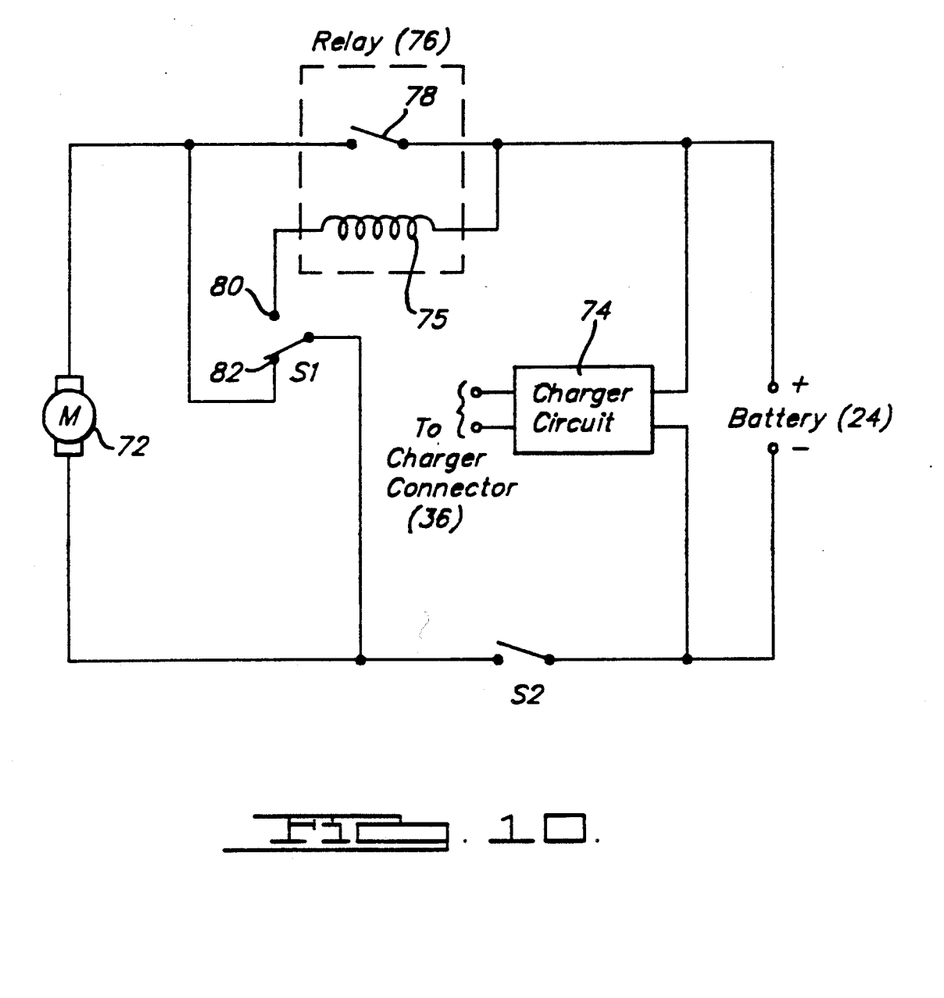
FIG. 10 is a circuit diagram of the power circuit of the lawn mower shown in FIG. 1.

Referring to FIG. 10, a schematic diagram of the power circuit 70 of the present cordless electric lawn mower 10 is shown. The normally open interlock switch S2 is connected in the power circuit 70 in series between the battery 24 and the motor 72. Also connected in series between the battery 24 and the motor 72 are the switch contacts 78 of a relay 76. The relay coil 75 is connected to switch contact 80 of switch S1 which is located in the housing 18 on the handle 16 of the mower 10. Switch S1 is normally in the OFF position illustrated in FIG. 10 with switch contact 82 closed and switch contact 80 open. Actuation of lever 19 on the handle 16 of the mower turns the switch S1 to its ON position which closes switch contact 80 and opens switch contact 82.

The power circuit 70 operates in the following manner. When the interlock switch S2 is open, the relay coil 75 cannot be energized regardless of the position of the handle switch S1. Thus, the relay contacts 78 remain open and no power is applied to the motor 72. However, when the interlock switch S2 is closed, actuation of the handle switch S1 to its ON position will energize the relay coil 75 and thereby close relay contacts 78 and provide power to the motor 72. In other words, the motor 72 cannot be operated unless both the interlock switch S2 is closed and the handle switch S1 is in the ON position. In addition, it will be appreciated that by connecting the handle switch S1 across the motor 72 in the OFF position of the switch S1, the motor 72 is dynamically braked when the operator releases the actuating lever 19 of the handle switch S1.

In addition, a charger circuit 74 is provided that is connected across the battery 24 to recharge the battery after use of the mower. Charging current is supplied to the charger circuit 74 typically from a step-down transformer that is plugged into a standard wall outlet and connected to the charger circuit 74 via the connector 36.

Figure 2:
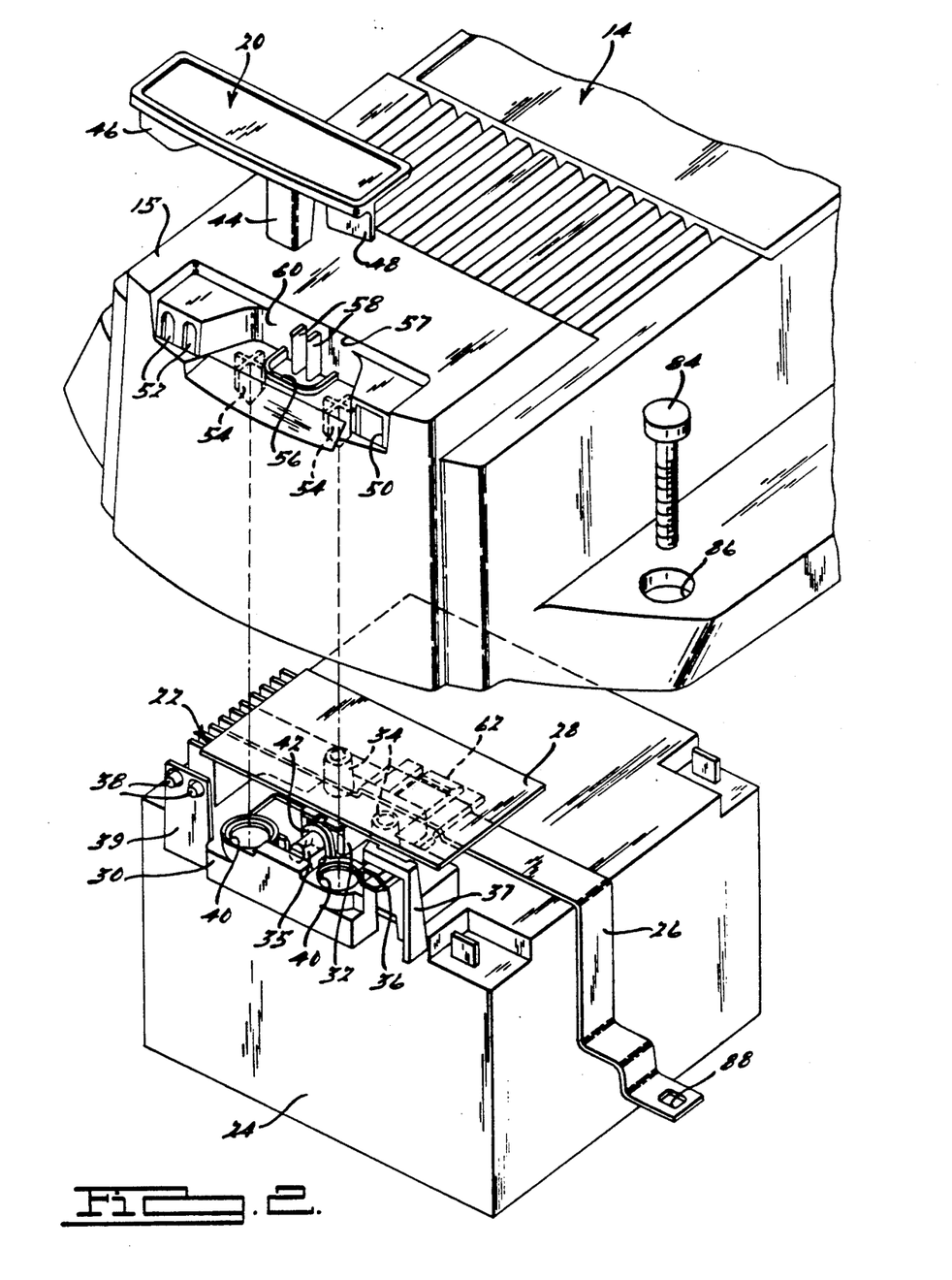
FIG. 2 is an exploded view of the rear portion of the lawn mower with the shroud removed to illustrate the module subassembly of the interlock system.
Figure 3:
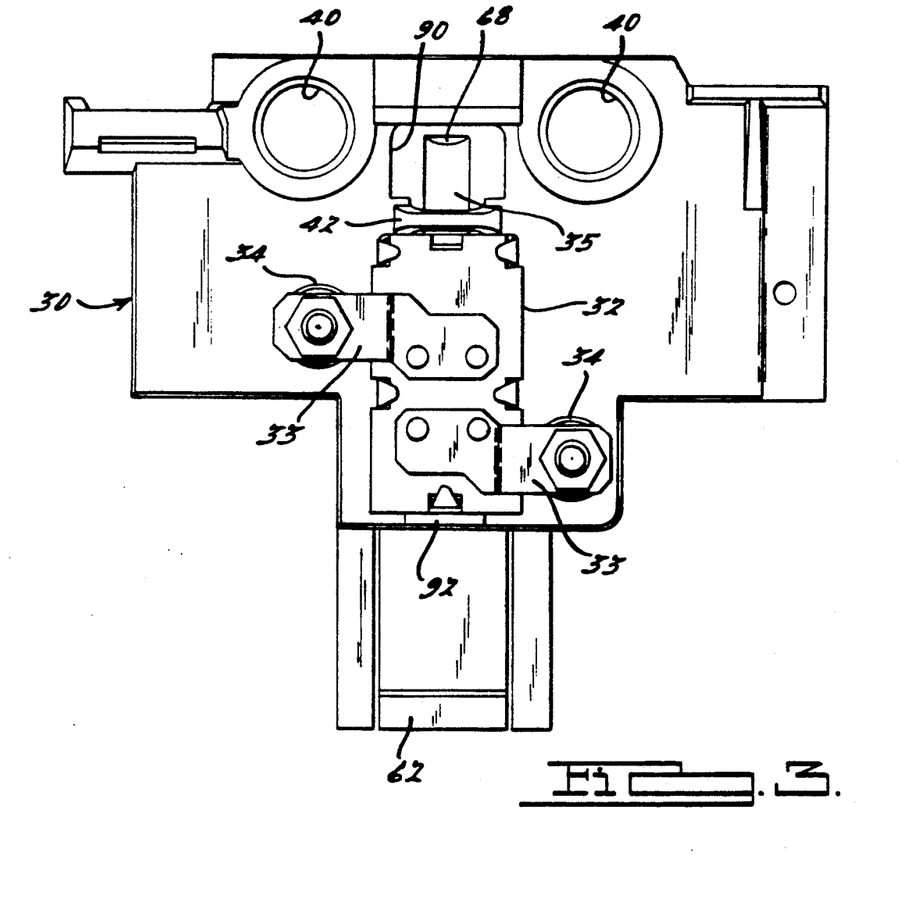
FIG. 3 is a plan view of the support bracket with the interlock switch mounted thereon.

Turning now to FIG. 2, an exploded view of the rear portion of the lawn mower 10 is shown. Mounted directly beneath the rear portion of the shroud 14 in the preferred embodiment is the rechargeable battery 24. Battery 24 is secured to the mower deck 12 via a metal strap 26. Additionally coupled to the strap 26 is a module subassembly 22 comprised of a plastic support bracket 30, an interlock switch 32, and a printed circuit board 28 containing the power circuit and the charger circuit for the cordless electric lawn mower 10. The printed circuit board 28 is mounted to the support bracket 30 via a pair of integrally formed posts 34 on the support bracket 30. The interlock switch 32 is of the normally open type and contains a plunger 35 that is spring biased to normally extend from the switch body. The interlock switch 32 is electrically connected to the power circuit on the PC board 28 and is also mounted to the support bracket 30. As best shown in FIG. 3, the interlock switch 32 contains a pair of laterally extending terminals 33 that are used to mount the interlock switch 32 to the posts 34 on the support bracket 30. By mounting the PC board 28 over the switch 32 and bolting both the switch and PC board to the posts 34, printed conductive pads (not shown) on the PC board 28 serve to automatically make electrical contact between the terminals 33 of the switch 32 and the power circuit on the PC board.

The charger circuit on the PC board 28 is adapted for electrical connection to an external source of charging current, typically from a transformer plugged into a wall outlet, via a connector 36 that is mounted to a first integrally formed mounting structure 37 on the support bracket 30. In addition, a pair of LEDs 38, one red and one green for providing visual indications of the battery charging condition and of the fully charged battery condition, respectively, is also mounted to a second integrally formed structure 39 on the support bracket 30. The rear portion of the support bracket 30 contains an integrally formed spring tab 62 that is adapted to be inserted under a raised stepped portion of the battery strap 26, as shown in phantom in FIG. 2 to loosely mount the module subassembly 22 to the battery 24.

The rear portion of the shroud 14 contains a recessed area 60 that is configured to receive the key member 20 so that when the key member 20 is installed in the mower, the top of the key member 20 will be flush with the top surface 15 of the shroud. This provides the operator with a convenient visual indication of the proper installation of the key member 20. A charger port 50 is formed in a rearward-facing wall on one side of the recess 60 for providing access to the charger circuit connector 36, and a pair of smaller ports 52 is formed in a rearward-facing wall on the other side of the recess 60 for exposing the two LEDs 38.

The key member 20 includes a central depending stem portion 44 that is adapted to fit into an opening 56 formed in the floor of the recessed area 60 of the shroud 14. The opening 56 is generally defined by the front wall 57 of the recess 60 and a U-shaped ridge 59. The opening 56 is partially obstructed by a pair of parallel fins 58 that project into the opening 56 from the front wall 57 of the recess 60, as shown. The fins 58 serve to specially configure the opening 56 a well as discourage the insertion of foreign objects, such as screwdrivers, into the opening 56 to improperly actuate the interlock switch 32 and defeat the interlock system.

Figure 5:
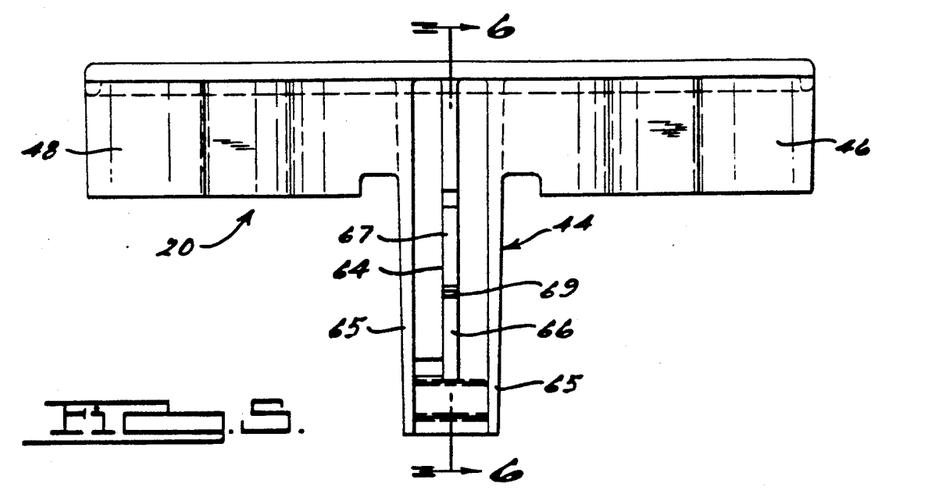
FIG. 5 is a front view of the key member.
Figure 6:
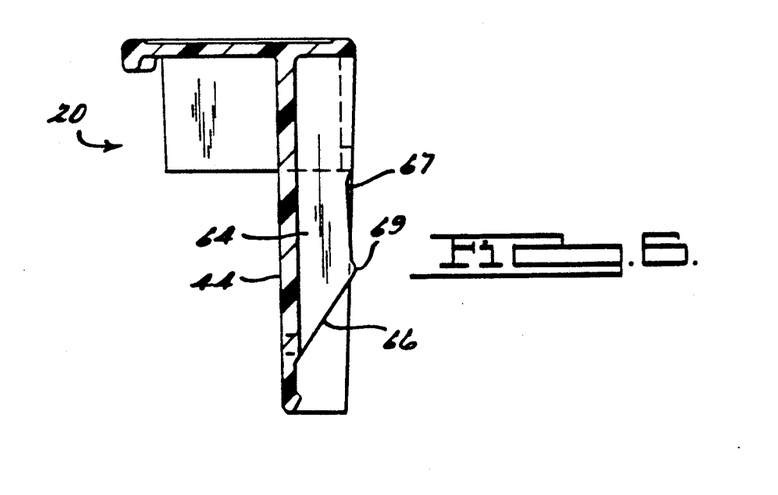
FIG. 6 is a section view of the key member taken along line 6—6 in FIG. 5.
Figure 7:
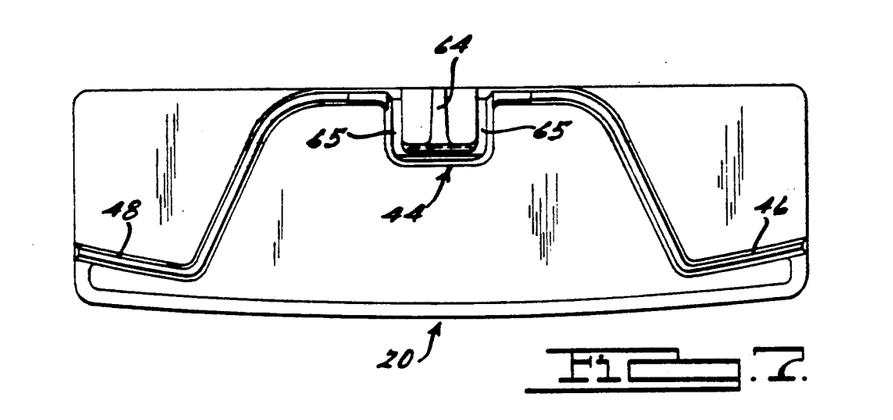
FIG. 7 is a bottom view of the key member.

With additional reference to FIGS. 5-7, the depending stem portion 44 of the key member 20 is correspondingly configured to fit into the opening 56 in the shroud 14. As best shown in FIG. 7, this results in the stem portion 44 having the general cross-sectional shape similar to the letter "M". Accordingly, the stem portion 44 of the key 20 defines two outer ribs 65 and a center rib 64, which interleave with the parallel fins 58 on the shroud 14 when the key member 20 is inserted into the opening 56 in the shroud 14.

Figure 8:
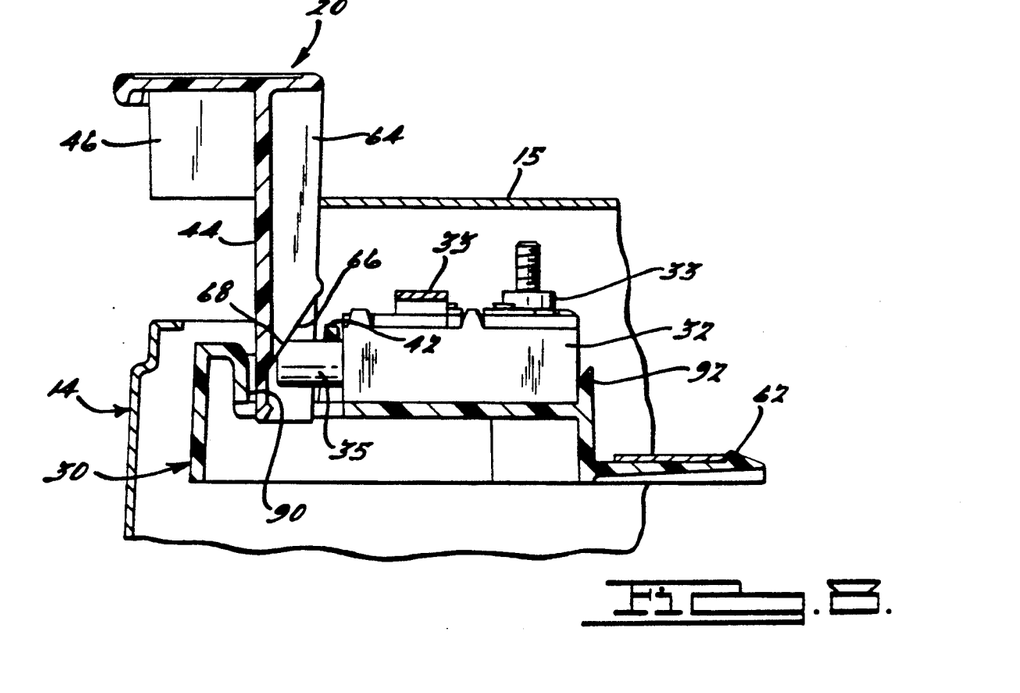
FIG. 8 is a partial sectional view of the key member as it is inserted into the opening in the shroud.
Figure 9:
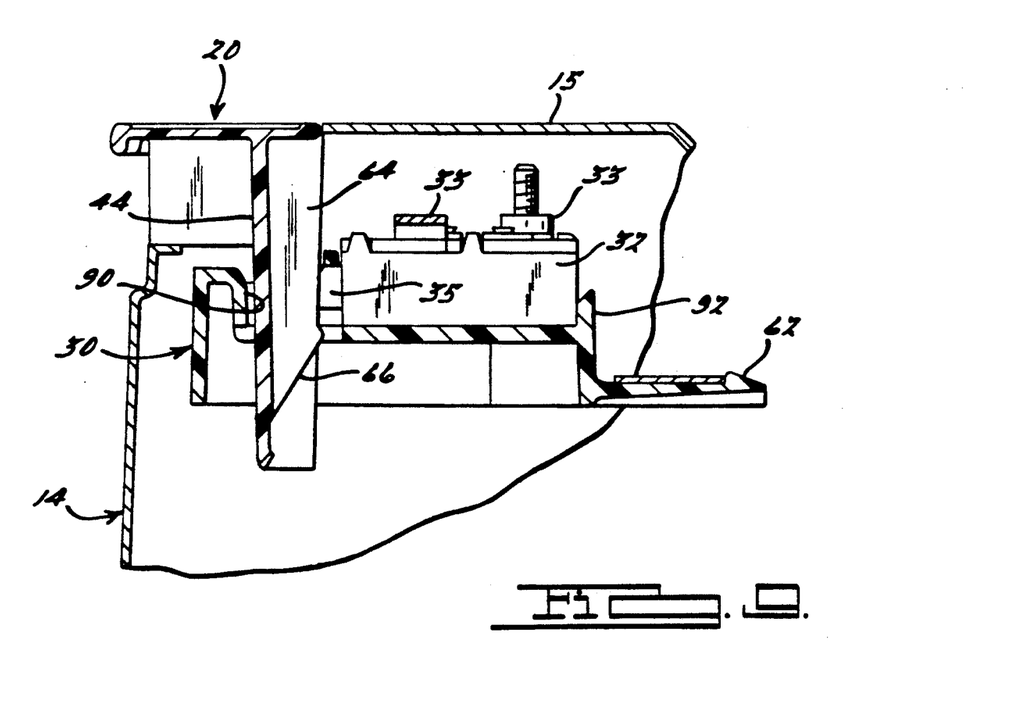
FIG. 9 is a partial sectional view of the key member fully inserted into the opening in the shroud.

As best shown in FIGS. 6, 8, and 9, the center rib 64 of the stem 44 has a cam surface 66 formed toward the lower end of the rib that is adapted to engage the plunger 35 of the interlock switch 32 when the key member 20 is inserted into the opening 56 in the shroud 14. In particular, as the key member 20 is inserted downwardly, the cam surface 66 on the center rib 64 will contact the plunger 35 (FIG. 8), causing the plunger 35 to retract into the switch body (FIG. 9), thereby electrically closing the interlock switch 32. To prevent the cam surface 66 on the center rib 64 from binding on the plunger 35, a chamfer 68 is formed on the upper surface of the plunger 35 to facilitate initial axial motion of the plunger 35. Preferably, the angle of the chamfer 68 formed on the plunger 35 corresponds to the angle of the cam surface 66 on the key member 20 so that full surface contact between the two components is achieved.

With particular reference to FIG. 6, it will be noted that the leading edge 67 of the center rib 64 above the cam surface 66 is formed with a slight back taper and a small nib 69 is formed at the juncture between the two surfaces 66 and 67. In this manner, when the key member 20 is inserted into the opening 56 in the shroud 14, the nib 69 on the center rib 64 will snap over the plunger 35 providing tactile feedback upon complete installation of the key member. In addition, the presence of the nib 69 together with the back taper of surface 67 ensures that the force or the internal spring in the interlock switch 32 urging the plunger 35 into its extended position does not dislodge the key member 20 from its installed position during operation of the mower.

Figure 4:
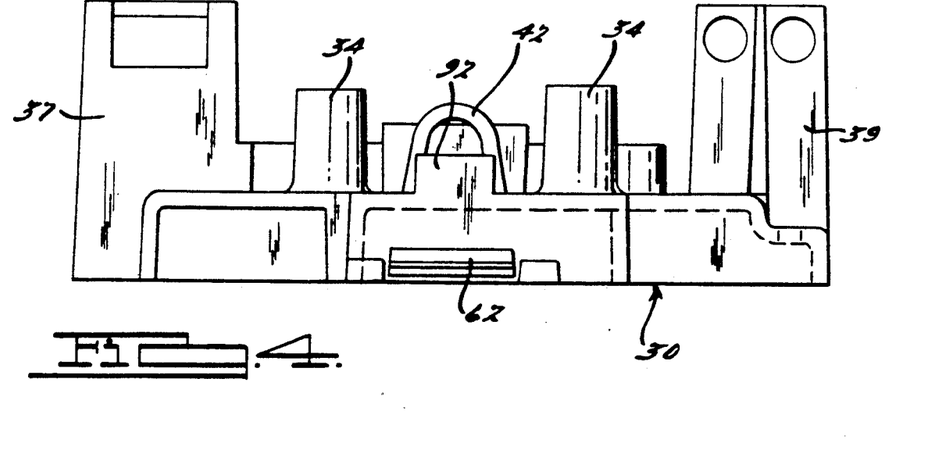
FIG. 4 is a rear view of the support bracket.

In view of the relatively fragile nature of the PC board 28, it is important that the relatively large mechanical forces applied to actuate the plunger 35 of the interlock switch 32 not be transferred to the PC board 28. In this regard, it will be noted that the support bracket 30 is provided with an integrally formed loop 42 (FIGS. 2 and 4) that extends over the top of the plunger 35 of the switch 32 to prevent the plunger 35 from being pulled upward when the key member 20 is extracted. In addition, as best shown in FIGS. 3 and 4, the support bracket 30 also has integrally formed thereon an upstanding wall 92 that is adapted to abut the rear surface of the interlock switch 32 opposite the plunger 35 when the switch 32 is mounted in position on the support bracket 30. In this manner, the wall 92 of the support bracket 30 absorbs the force acting on the body of the switch 32 when the plunger 35 is depressed by insertion of the key member 20.

Returning to FIG. 2, the key member 20 is also provided with a pair of integrally formed depending tabs 46 and 48 that are adapted to cover the LED ports 52 and the charger connector port 50, respectively, when the key member 20 is in the installed position. Accordingly, it will be appreciated that insertion of the key member 20 not only serves to close interlock switch 32 to thereby enable the power circuit of the lawn mower, but also to mechanically cover the charger connector port 50 so that the lawn mower cannot be charged when enabled for operation. Conversely, when the key member 20 is removed from the mower, allowing the interlock switch 32 to return to its normally open position and thereby disable the power circuit of the lawn mower, the charger connector 36 is exposed and therefore accessible to connection to a plug from a charging transformer. In addition, the removal of the key member 20 also exposes the two LEDs 38 which as previously noted provide visual indications of the operating state of the charger circuit.

To ensure proper alignment between the opening 56 in the shroud 14 and the plunger 35 of the interlock switch 32 during assembly of the mower 10, the support bracket 30 to which the switch is mounted contains a pair of alignment holes 40 adapted to receive a corresponding pair of locator posts 54 integrally formed on the underside of the shroud 14 (FIG. 2). Thus, when the shroud 14 is placed over the battery 24 and module 22 during assembly, the locator posts 54 extend into and snugly engage the alignment holes 40 in the support bracket 30, thereby establishing the proper orientation between the shroud 14 and the module subassembly 22. The shroud 14 and battery 24 are then secured to the mower deck 12 via bolts 84 which extend through holes 86 and 88 in the shroud 14 and battery strap 26, respectively.

Accordingly, it will be appreciated that the connection between the spring tab 62 of the support bracket 30 and the battery strap 26 generally locates the position of the module subassembly 22, and that upon installation of the shroud 14 to the mower deck 12, the position of the module subassembly 22 relative to the shroud 14 is precisely located by the interengagement of the locating posts 54 with the alignment holes 40. In addition, it will further be appreciated that the present construction technique allows the module subassembly 22 to essentially "float" between the battery 24 and the shroud 14, while at the same time maintaining the proper alignment with the shroud 14.

To additionally ensure that the key member 20 is aligned properly when installed, a hole 90 (FIG. 3) is formed in the support bracket 32 which is configured to conform to the external shape of the stem 44 of the key member 20. Moreover, ti will be noted that by locating the cam surface 66 on the center rib 64 an appropriate distance from the distal end of the stem (FIG. 6), it is further ensured that the distal end of the stem 44 will enter the hole 90 before the cam surface 66 contacts the plunger 35 of the switch 32. Thus, proper alignment between the cam surface 66 on the key member 20 and the plunger 35 of the switch 32 is assured. Moreover, due to the correspondence between the configuration of the hole 90 and the external shape of the stem 44, possible canting or twisting of the key member 20 during installation is substantially avoided.

Finally, it will be noted that the support bracket 30 also has integrally formed thereon an upstanding wall 92 that is adapted to abut the back surface of the interlock switch 32 opposite the plunger 35. In this manner, the wall 92 of the support bracket 30 absorbs the force acting on the body of the switch 32 when the plunger 35 is depressed by insertion of the key member 20.

While the above description constitutes the preferred embodiment of the invention, it will be appreciated that the invention is susceptible to modification, variation, and change without departing from the proper scope or fair meaning of the accompanying claims.

We claim:

1. An electrically powered lawn mower comprising a mower deck, an electric motor mounted to the mower deck for rotatably driving a cutting blade located beneath the mower deck, a handle connected to the mower deck, a shroud covering the motor, a power circuit including a rechargeable battery for providing electrical power to the motor and an electrical connector adapted for connection to an external source of electrical current for charging said battery, a manually operable electric switch mounted to the handle and connected in said power circuit and having ON and OFF positions for controlling the application of electrical power to the motor, and an interlock system for controlling the enabling of said power circuit, including
an interlock switch connected in said power circuit and having an actuator for controlling the state of said interlock switch; said interlock switch having a first normal state for disabling said power circuit and a second state for enabling said power circuit, such that when said interlock switch is in said first state the electric motor cannot be energized by said power circuit regardless of the position of said handle mounted switch, and when said interlock switch is in said second state the electric motor is energizable by said power circuit in accordance with the position of said handle mounted switch;

means for mounting said interlock switch within said shroud adjacent a specially configured first opening in said shroud such that the actuator of said interlock switch is accessible through said first opening; and a key member configured for insertion into said first opening in said shroud and including actuating means for engaging said actuator of said interlock switch and causing said interlock switch to switch from said first state to said second state to thereby enable said power circuit when said key member is fully inserted into said first opening in said shroud and further including means for blocking access to said electrical connector when said key member is fully inserted into said first opening in said shroud to thereby prevent said battery from being charged when said interlock switch is in said second state.

2. The lawn mower of claim 1 wherein said interlock switch is mounted to a bracket member that is joined to said shroud by alignment means for aligning the actuator of said interlock switch with said first opening in said shroud.

3. The lawn mower of claim 2 wherein said power circuit is contained on a printed circuit board that is also mounted to said bracket member.

4. The lawn mower of claim 2 wherein said key member actuating means comprises a stem portion having a cam surface thereon for engaging the actuator of said interlock switch.

5. The lawn mower of claim 4 wherein said bracket member has a second opening formed therein that is aligned with said first opening in said shroud and configured to conform to the shape of said stem portion for receiving said stem portion, said second opening being located adjacent said actuator when said interlock switch is mounted on said bracket member for aligning said cam surface with said actuator when said stem portion is inserted into said second opening.

6. The lawn mower of claim 5 wherein said stem portion has a distal end and said cam surface is positioned on said stem portion such that the distal end of said stem portion enters said second opening in said bracket member before said cam surface engages said actuator.

7. The lawn mower of claim 1 wherein said key member is further configured to be flush with the surface of said shroud when fully inserted into said first opening in said shroud.

8. The lawn mower of claim 1 further including means for retaining said key member in said fully inserted position.

9. The lawn mower of claim 1 wherein said bracket member is located between said battery and said shroud and further includes coupling means for loosely connecting said bracket member to said battery.

10. An electrically powered device having an electric motor, a housing for said electric motor, a power circuit including a rechargeable battery for providing electrical power to the motor and an electrical connector adapted for connection to an external source of electrical current for charging the battery, and an interlock system comprising:

an interlock switch connected in said power circuit and having an actuator for controlling the state of said interlock switch, said interlock switch having a first normal state for disabling said power circuit and a second state for enabling said power circuit;

support and alignment means for positioning said interlock switch within said housing adjacent a specially configured first opening in such housing such that the actuator of said interlock switch is aligned with said first opening, including a support bracket having mounting means for mounting said interlock switch in a predetermined position on said support bracket and alignment means for fixing the position of said support bracket relative to said housing; and a key member configured for insertion into said first opening in said housing and including actuating for engaging said actuator of said interlock switch and causing said interlock switch to switch from said first state to said second state to thereby enable said power circuit when said key member is fully inserted into said first opening in said housing and further including means for blocking access to said electrical connector when said key member is fully inserted into said first opening in said housing to thereby prevent said battery from being charged when said interlock switch is in said second state.

11. The device of claim 10 wherein said support bracket further includes a second opening aligned with said first opening in said housing and configured to conform to the shape of said key member actuating means for receiving said actuating means, said second opening being located adjacent said actuator when said interlock switch is mounted on said support bracket for aligning said actuating means with said actuator.

12. The device of claim 10 wherein said power circuit includes a manually operable electric switch having ON and OFF positions for controlling the application of electrical power to the motor when said interlock switch is in said second state.

13. The device of claim 12 wherein said power circuit is contained on a printed circuit board that is also mounted to said support bracket.

14. The device of claim 11 wherein said key member actuating means comprises a stem portion having a cam surface formed thereon for engaging the actuator of said interlock switch.

15. The device of claim 14 wherein said stem portion has a distal end and said cam surface is positioned on said stem portion such that the distal end of said stem portion enters said second opening in said support bracket before said cam surface engages said actuator.

16. The device of claim 10 wherein said key member is further configured to be flush with the surface of said housing when fully inserted into said first opening in said housing.

17. The device of claim 10 further including means for retaining said key member in said fully inserted position.

18. An interlock system for an electrically powered device having an electric motor, a housing for said electric motor, a power circuit including a rechargeable battery for providing electrical power to the motor and an electrical connector adapted for connection to an external source of electrical current for charging the battery, and a first manually operable electric switch connected in said power circuit and having ON and OFF positions for controlling the application of electrical power to the motor, comprising:
- an interlock switch connected in said power circuit and having an actuator for controlling the state of said interlock switch; said interlock switch having a first normal state for disabling said power circuit and a second state for enabling said power circuit, such that when said interlock switch is in said first state the electric motor cannot be energized by said power circuit regardless of the position of said first electric switch, and when said interlock switch is in said second state the electric motor is energizable by said power circuit in accordance with the position of said first electric switch;
- means for mounting said interlock switch within said housing adjacent a specially configured opening in such housing such that the actuator of said interlock switch is accessible through said opening; and
- a key member configured for insertion into said opening in said housing and including actuating means for engaging said actuating of said interlock switch and causing said interlock switch to switch from said first state to said second state to thereby enable said power circuit and further including means for blocking access to said electrical connector when said key member is fully inserted into said opening in said housing to thereby prevent said battery from being charged when said interlock switch is in said second state.

19. A cordless, electric lawn mower comprising a mower deck, an electric motor mounted to the mower deck for rotatably driving a cutting blade located beneath the mower deck, a rechargeable battery for providing electrical power to the motor, a handle connected to the mower deck, a shroud covering the motor and battery, a power circuit for providing electrical power to the motor, a manually operable electric switch mounted to the handle and connected in said power circuit and having ON and OFF positions for controlling the application of electrical power to the motor, an electrical connector adapted for connection to an external source of electrical current for charging the battery, and an interlock system for controlling the enabling of said power circuit, including
- an interlock switch connected in said power circuit and having an actuator for controlling the state of said interlock switch; said interlock switch having a first normal state for disabling said power circuit and a second state for enabling said power circuit, such that when said interlock switch is in said first state the electric motor cannot be energized by said power circuit regardless of the position of said handle mounted switch, and when said interlock switch is in said second state the electric motor is energizable by said power circuit in accordance with the position of said handle mounted switch;
- means for mounting said interlock switch within said shroud adjacent a specially configured first opening in said shroud such that the actuator of said interlock switch is accessible through said first opening, including a bracket member having mounting means for mounting said interlock switch in a predetermined position thereon and alignment means for coupling said bracket member to said shroud to fix the position of said bracket member relative to said shroud; and
- a key member having a stem portion configured for insertion into said first opening in said shroud and including actuating means on said stem portion for engaging said actuator of said interlock switch and causing said interlock switch to switch from said first state to said second state to thereby enable said power circuit when said key member is fully inserted into said first opening in said shroud, and further including means for blocking access to said electrical connector when said key member is fully inserted into said first opening in said shroud to thereby prevent the battery from being charged when said power circuit is enabled.

20. The cordless lawn mower of claim 19 wherein said key member is further configured to be flush with the surface of said shroud when fully inserted into said first opening in said shroud.

21. The cordless lawn mower of claim 19 wherein said actuating means comprises a cam surface on said stem portion.

22. The cordless lawn mower of claim 21 wherein said bracket member has a second opening formed therein that is aligned with said first opening in said shroud and configured to conform to the shape of said stem portion for receiving said stem portion, said second opening being located adjacent said actuator when said interlock switch is mounted on said bracket member for aligning said cam surface with said actuator when said stem portion is inserted into said second opening.

23. The cordless lawn mower of claim 19 wherein said stem portion has a distal end and said cam surface is positioned on said stem portion such that the distal end of said stem portion enters said second opening in said bracket member before said cam surface engages said actuator.

24. The cordless lawn mower of claim 19 wherein said power circuit is contained on a printed circuit board that is also 25. The cordless lawn mower of claim 19 wherein said bracket member further includes coupling means for loosely fastening said bracket member to said battery.

26. The cordless lawn mower of claim 25 wherein said battery is secured to said mower deck by a strap that extends over the battery and further wherein said coupling means comprises a resilient tab member that is adapted to fit under said strap and loosely fasten said bracket member to said battery.

* * * * *